United States Patent [19]
Wardlaw, III

[11] Patent Number: 5,101,604
[45] Date of Patent: * Apr. 7, 1992

[54] SUBTERRANEAN WELL WELDING HABITAT

[75] Inventor: Louis J. Wardlaw, III, Cypress, Tex.

[73] Assignee: Hot Hed, Inc.

[*] Notice: The portion of the term of this patent subsequent to May 28, 2008 has been disclaimed.

[21] Appl. No.: 684,327

[22] Filed: Apr. 12, 1991

Related U.S. Application Data

[63] Continuation of Ser. No. 517,926, May 2, 1990, Pat. No. 5,018,321.

[51] Int. Cl.⁵ .................................................. E04G 11/04
[52] U.S. Cl. ......................................... 52/2.17; 52/2.14; 52/2.25; 135/116; 135/900; 454/49; 454/251
[58] Field of Search .................. 52/2, 2.14, 2.17, 2.25; 98/33.1, 115.1; 135/92, 116, 900; 405/262

[56] References Cited

U.S. PATENT DOCUMENTS

| | | | |
|---|---|---|---|
| 2,872,933 | 2/1959 | Mackey | 52/2.17 X |
| 3,250,024 | 5/1966 | Douthitt et al. | 52/2.17 X |
| 3,335,529 | 8/1967 | Gedney | 52/2.14 |
| 3,452,764 | 7/1969 | Bell | 135/900 X |
| 3,525,290 | 8/1970 | Pelsue | 135/900 X |
| 3,626,836 | 12/1971 | Schneidler | 52/2.17 X |
| 3,783,906 | 1/1974 | Matherne | 135/900 X |
| 3,946,571 | 3/1976 | Pate et al. | 405/244 |

FOREIGN PATENT DOCUMENTS

| | | | |
|---|---|---|---|
| 681345 | 9/1939 | Fed. Rep. of Germany | 135/92 |
| 2135965 | 2/1973 | Fed. Rep. of Germany | 52/2.2 |
| 497787 | 12/1938 | United Kingdom | 52/2.27 |

*Primary Examiner*—Harold Joyce
*Attorney, Agent, or Firm*—Jackson & Walker

[57] ABSTRACT

A fluid transmission conduit welding habitat is provided, having an outer air supportable arcuate dome which is mounted over a point to entrap welding slag, sparks, and the like. A fire-resistant shield is disposed around the interior of the dome. Air supplied to the dome for selectively suspending the habitat. A conduit, filter, or the like is provided through the top of the dome to permit discharge of smoke including particulate matter resulting from the welding procedure. The air supply may be in alignment with the smoke discharge whereby the supply of air forms a carrier fluid for transmitting the smoke and particulate matter out of the dome.

12 Claims, 1 Drawing Sheet

SUBTERRANEAN WELL WELDING HABITAT

This is a continuation of co-pending application Ser. No. 517,926 filed on May 2, 1990 Pat. No. 5,018,321.

BACKGROUND OF THE INVENTION

1. Field of the Invention

The invention is directed to a flexible fluid conduit welding habitat for entrapment of welding slag, sparks and the like when welding operations are performed on the uppermost end of casing, drill or work string, or the like.

2. Brief Description of the Prior Art

Subsequent to the drilling of a subterranean oil or gas well, whether such well be located inland, or on a well platform, drill ship, simisubmersible, or the like, the well is completed by introduction of a tubular conduit which is often time referred to as "casing". The casing is cemented in place as part of the completion operation.

Prior or subsequent to the introduction of one or more sections of casing conduit forming the casing string into the subterranean well, it may be necessary or desirable to perform a welding operation to one or more ends of the casing to affix, for example, a blowout preventor, or other component desirable to be fixedly secured to the casing conduit section. In many instances, such component will be affixed to such casing conduit member by welding operations well known to those in the industry. As a result of the flame discharge from the welding torch, during the welding operation, sparks, slag and other depris can be expected to be discharged into the air around the welding operation resulting in a serious fire hazzard during the welding operation. Such slag and sparks could touch off a fire or even orse, an explosion, since the casing often times will be introduced into a "live" well which, at any time, could become uncontrollable as a result of a leak or blowout of flammable fluids, such as natural gas, or the like. The present invention addresses this problem by providing a flexible fluid conduit welding habitat which not only entraps the slag and sparks during the welding procedure in an area which is isolated from the well fluids, but also provides a habitat for the controlled dissemination of such slags and sparks through the habitat and away from the welding operation in a safe and controllable fashion.

The relevant prior art of which applicant is aware is as reflected in the following U.S. patents:

U.S. Pat. No. 2,872,933, entitled "Air-drilling Rig Cover".

U.S. Pat. No. 3,308,266, entitled "Method and Apparatus for Welding of Rails".

U.S. Pat. No. 3,837,171, entitled "Inflatable Underwater Structure".

U.S. Pat. No. 3,946,571, entitled "Service Module for Environment".

U.S. Pat. No. 3,991,583, entitled "Method of Providing an Underwater Enclosure".

U.S. Pat. No. 4,257,720, entitled "Apparatus and Method for Driving Members Into the Ocean Floor".

SUMMARY OF THE INVENTION

A flexible fluid conduit welding habitat is provided for entrapment of slag, sparks and the like. The habitat includes an outer air-suspandable arcuate dome which is mountable over a point. The point of the receives a conduit member upon which a welding procedure is to be effected. A fire-resistant shield element is disposable around at least a part of the interior of the dome. Means for introducing a supply of air is provided for selectively suspending the dome over the entry point, and includes a motor driven air, a fan, or the like. Means extend through the upper portion of the dome and away from the entry point to communicate with the interior of the dome to permit the discharge of smoke including particulate matter, resulting from the welding procedure to be effectively discharged from the interior of the dome. The means for introducing a supply of air and the means extending through an upper portion of the dome may be in alignment whereby the supply of air forms a carrier fluid for transmitting the smoke and the particulate matter at least to the means extending through the upper portion of the dome, and, preferably, for transmitting it to and through the exterior of the dome without assistance of any other means. The habitat also may include a fire-resistant skirt which is disposable around the uppermost exterior portion of the conduit member and extend to the shield to assure that the slag and spark are not discharged around the exterior of the casing, conduit or other fluid transmission member.

BRIEF DESCRIPTION OF THE SOLE DRAWING

FIG. 1, the sole illustration, is a longitudinal part sectional schematic illustration showing the welding habitat in position over a subterranean well.

DESCRIPTION OF THE PREFERRED EMBODIMENTS

Figure 1:
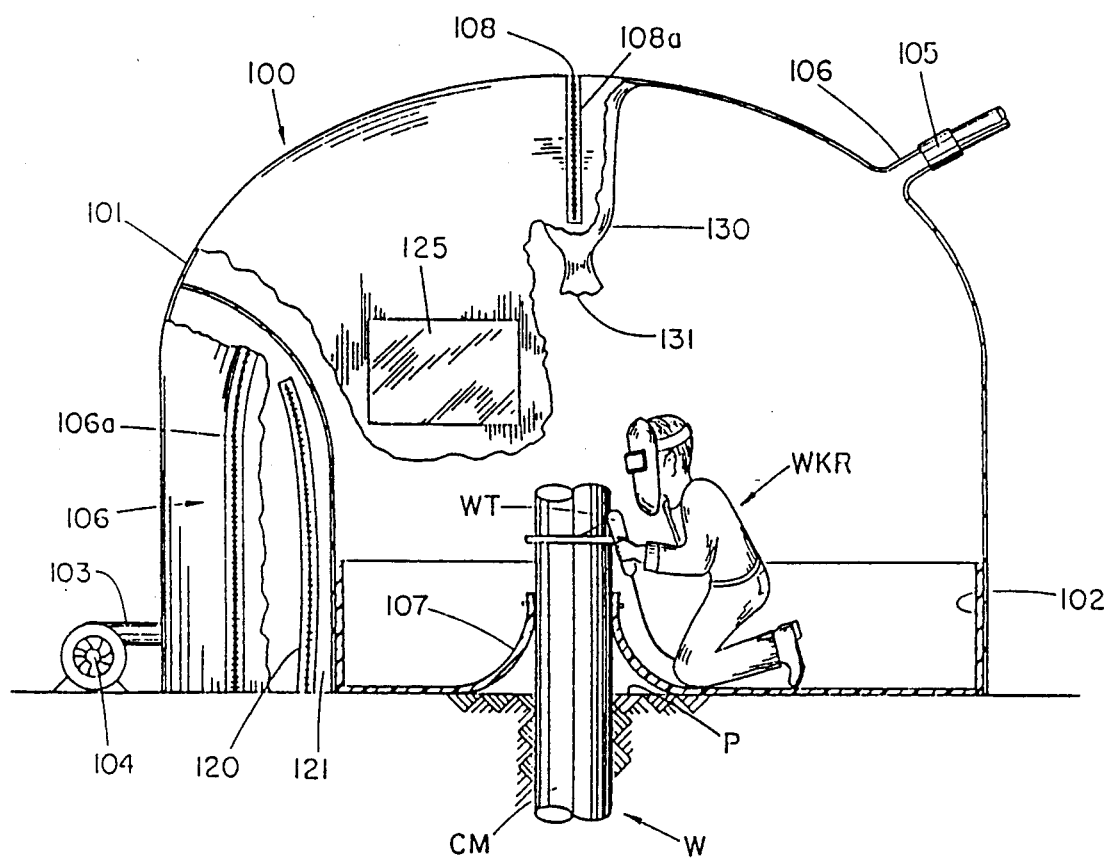

Now with reference to FIG. 1, there is shown extending within a well W through an entry point P a subterranean well transmission conduit member CM.

The welding habitat 100 of the present invention comprises an arcuate dome 101 which may be manufactured of various and known airtight materials such as vinal-coated nylon fabric or a laminated fabric which is not required to be completely airpressure tight but which is sufficient to be inflatably suspended over the well W by means of a commercial fan or blower 104 driven by an electric motor (not shown) in communication with a means for introducing the supply of air 103, or blower tube, into the welding habitat 100. In effective flow alignment with blower tube 103 is provided means extending through the upper portion of the dome 105, such as a conventional smoke or other filter, such as a disposable cartridge filter, or simply a pvc tube through an opening 106 which securely receives the member 105. In the event that the welding habitat 100 is used in an offshore or other location where the discharge of smoke and other particulate matter through the top of the habitat 100 into the atmosphere is not regulated or is not critical with respect to qualitative discharge, the means extending through the upper portion of the dome simply may be a port or the opening 106, itself.

Around the lowermost portion of the interior of the welding habitat 100 is provided a fire-resistant shield 102 which may be formed of flexible refractory cloth. The fire-resistant shield 102 should be placed within the interior of the welding habitat 100 around the complete interior and at a height of about 36 inches above the uppermost end of the casing or other transmission conduit CM to assist in controlling the slag and sparks in the welding operation.

A welder WKR will perform a welding operation utilizing a conventional torch-type settling torch WT which is affixed to the element to be secured to the casing CM. A fire-resistant skirt 107 is placed around the uppermost end of the well transmission conduit CM and extends around the bottom, or floor, of the welding habitat 100 to further control the abatement of the sparks and the like.

A window 125, made of plastic, or the like, may be placed within the habitat 100 to observe the welder WKR, or for other visual communication purposes.

An entry 106 is provided within the welding habitat 100 to permit entry and exit of the welder WKR and is secured thereto by means of the zipper 106a. Again, the entry 106 may be opened by movement of the zipper 106a, yet the amount of air introduced through the fan 104 and into the interior of the welding habitat 100 will sufficiently maintain the habitat 100 in its suspended position over the well W.

In order to resume effective air suspension of the habitat 100 during periods when operations personnel and equipment pass through the entry 106, an air lock 121 is interiorly secured across the entry 106 within the habitat 100, using refractory cloth, or the like. An air lock zipper 121 is provided on the air lock 121 such that personnel entering the habitat 100 first move the zipper 106a to open the entry 106 while the air lock 121 is closed at its zipper 120. When the personnel are in the habitat 100, the zipper 106a is moved to close the entry 106 before the air lock 121 is opened at the zipper 120. This procedure is, of course, reversed, upon exit from the habitat 100.

A second upper opening 108 is also provided at the uppermost portion of the dome of the welding habitat 100 with the zipper 108a therein in the event that equipment or component parts of the welding operation are required to be introduced through the uppermost dome end of the habitat 100. Additionally, the opening 108 would also permit a section of casing, itself, to be elongatedly extended through the uppermost end of the habitat 100, in the event that it is desired to be welded or otherwise affixed to the casing member CM prior to or subsequent to any type of welding procedure in the immediate area interiorly of the welding habitat 100.

In the event that it is desired to extend the casing or other fluid transmission conduit member CM through the habitat 100, a top air lock sealing skirt 130 is provided interiorly within the dome 101 with open end 131 being provided for receipt of the member 131. An elasticized belt (not shown), or other securing means, is provided to contourly engage the open end 131 around the conduit member CM, which may pass through the dome 101 and extend out of the top of the habitat 100, when the opening 108 is opened at zipper 108a.

In operation, the habitat 100 may be conveniently stored in its deflated condition. When it is desired to be utilized, it may be transported to the area immediate the well W such that it is positioned approximately medially over the transmission conduit member CM. Thereafter, the fan 104 is secured to the air supply tube 103 and to the motor for the fan and is electrically operated in known fashion to provide blowing of air through the welding habitat 100. As the fan 104 forces air within the habitat 100, it is expanded for suspension over the well W. Now, the welder WKR may pass through the entry 106, close the zipper 106a and secure the fire-resistant skirt 107 utilizing tape, or other temporary securing means, around the uppermost end of the well transmission conduit member CM and the fire-resistant shield 102 may also be extended around the welding habitat 100 if it is not already provided in a permanent form defining the lowermost interior portion of the habitat 100. With the entry 106 and opening 108 closed, the welding operation may now be begun. Sparks and slag will be prevented from being discharged exteriorly of the habitat 100, or within the conduit member CM and may only be discharged through the opening 106 and means 105. When the opening 106 and means 105 are in flow alignment with the fan 104, the fluid flow which also is utilized to suspend the welding habitat 100 may also assist and provide a fluid stream for effective carriage of smoke including particulate matter from the welding operation safely from the interior of the welding habitat 100 through the opening 106 and through the means 105, for emission into the atmosphere in a controlled fashion.

As utilized in the present invention, the fire-resistant shield 102 may be formed of any known fire-resistant material.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. A flexible welding habitat for entrapment of welding slag, sparks, and the like, during welding along a fluid transmission conduit, comprising;
   an outer air-suspendable arcuate dome mountable over a point along said fluid transmission conduit and upon which a welding procedure is to be effected;
   a fire-resistant shield element disposable around at lease part of the interior of said dome;
   means for introducing a supply of air for selectively suspending said dome over said point; and
   means extending through an upper portion of said dome and away from said point and communicating with the interior of said dome to permit smoke including particulate matter resulting from the welding procedure to be effectively discharged from the interior of said dome.

2. The habitat of claim 1, said means for introducing a supply of air and said means extending through an upper portion of said dome being in alignment whereby said supply of air additionally forms a carrier fluid for transmitting the smoke and particulate matter at least to the means extending through the upper portion of said dome.

3. The habitat of claim 1 or claim 2 further comprising a selectively closable entry through said dome for access to the interior of the dome by a laboror.

4. The habitat of claim 1 or claim 2 further comprising a fire-resistant skirt disposable around the uppermost exterior portion of said conduit member and extending to said shield.

5. The habitat of claim 1 further comprising a personnel and equipment entry and air lock means across said entry.

6. The habitat of claim 5 further comprising:
   (a) an air lock sealing skirt interiorly positioned within said dome;

(b) a selectively closeable opening through said dome in alignment with said air lock sealing skirt; and
(c) an opening around said skirt for contourly receiving said conduit therethrough.

7. The habitat of claim 1 further comprising:
(a) an air lock sealing skirt interiorly positioned within said dome;
(b) a selectively closeable opening through said dome in alignment with said air lock sealing skirt; and
(c) an opening around said skirt for contourly receiving said conduit therethrough.

8. A flexible welding habitat comprising an outer air-inflatable arcuate dome which is arranged to be mounted over a point on a fluid transmission conduit upon which a welding procedure is to be effected; a fire-resistant shield element disposable around at least part of the interior of the dome; means for use in introducing into the dome a supply of air for inflating the dome; and means extending through an upper portion of the dome and communicating with the interior of the dome to permit smoke, including particulate matter resulting, in use, from the welding procedure to be discharged from the interior of the dome.

9. A habitat according to claim 8 wherein the means for introducing a supply of air and the means extending through an upper portion of the dome or positioned substantially opposite one another across the center of the dome whereby the supply of air additionally forms, in use, a carrier fluid for assisting in transmitting and discharging the smoke and particulate matter.

10. A habitat according to claim 8 or claim 9 further comprising a selectively closeable entry into the dome for access to the interior of the dome by a person.

11. A habitat according to claim 10 wherein the entry includes an air lock.

12. A habitat according to claim 8 further comprising a fire-resistant skirt which is arranged to be disposed, in use, around an upper portion of a conduit member extending upwardly into the dome, the skirt extending to the shield.

* * * * *